United States Patent [19]

Shih et al.

[11] Patent Number: 4,690,996

[45] Date of Patent: Sep. 1, 1987

[54] INVERSE EMULSIONS

[75] Inventors: Yen-Jer Shih, Somerset; John (Ji-Hsiung) Tsai, Belle Meade; Wen B. Chiao; Dilip K. Ray-Chaudhuri, both of Bridgewater, all of N.J.

[73] Assignee: National Starch and Chemical Corporation, Bridgewater, N.J.

[21] Appl. No.: 770,332

[22] Filed: Aug. 28, 1985

[51] Int. Cl.$^4$ .............................................. C08L 51/02
[52] U.S. Cl. ...................................... 527/312; 527/313; 527/314; 523/130; 252/8.551
[58] Field of Search ......................... 527/312, 313, 314; 156/328

[56] References Cited

U.S. PATENT DOCUMENTS

| | | | |
|---|---|---|---|
| 2,668,156 | 2/1954 | Caldwell et al. | 527/313 |
| 2,733,238 | 1/1956 | Kerr et al. | 536/106 |
| 2,996,498 | 8/1961 | Jarowenko | 536/111 |
| 3,061,471 | 10/1962 | Brockway et al. | 117/139.5 |
| 3,061,472 | 10/1962 | Brockway et al. | 117/139.5 |
| 3,095,391 | 6/1963 | Brockway et al. | 527/312 |
| 3,171,805 | 3/1965 | Suen et al. | 210/54 |
| 3,259,570 | 7/1966 | Priesing et al. | 210/53 |
| 3,284,393 | 11/1966 | Vanderhoff | 524/801 |
| 3,418,237 | 12/1968 | Booth et al. | 210/54 |
| 3,734,873 | 5/1973 | Anderson et al. | 523/336 |
| 3,809,664 | 5/1974 | Fanta et al. | 527/312 |
| 3,826,771 | 7/1974 | Anderson et al. | 523/336 |
| 3,976,552 | 8/1976 | Fanta et al. | 522/89 |
| 4,060,506 | 11/1977 | Verbanac | 526/238.22 |
| 4,079,025 | 3/1978 | Young et al. | 525/54.43 |
| 4,115,332 | 9/1978 | Young et al. | 526/238.22 |
| 4,131,576 | 12/1978 | Iovine et al. | 527/312 |
| 4,355,073 | 10/1982 | Knightley | 428/350 |

*Primary Examiner*—Morton Foelak
*Assistant Examiner*—Nathan M. Nutter
*Attorney, Agent, or Firm*—Ellen T. Dec; Edwin M. Szala

[57] ABSTRACT

Polysaccharide graft copolymers are prepared by a water-in-oil emulsion polymerization process in which the polysaccharide and water-soluble monomer are emulsified in an oil phase containing emulsifying agents and polymerized therein. The resultant emulsion polymers are in stable form and may be used directly, for example, as adhesives for prepasted wallpaper, or may be inverted into aqueous systems and used for their thickening or flocculating properties.

20 Claims, No Drawings

INVERSE EMULSIONS

BACKGROUND OF THE INVENTION

This invention relates to water-in oil emulsions of water soluble or water swellable starch graft copolymers and to a process for the preparation thereof.

Polymers derived from grafting water soluble monomers to carbohydrates find use in a variety of applications including use as paper filler retention aids, adhesives, sizings, flocculants, ion exchange resins, drilling mud additives, and water treatment aids.

Method for preparing graft copolymers of polysaccharides such as starches, cellulose and gums are well known in the literature. See, for example, Block and Graft Copolymerization, Vol. 1, R. J. Ceresa, ed., John Wiley and Sons (1973). Such methods, as represented by the teachings of U.S. Pat. Nos. 3,809,664, 3,976,552, and 4,131,576, include polymerizations in water, in water solvent mixtures and in the dry state, and may be initiated by mechanical, chemical and irradiative techniques.

Most of the above-described methods, however, are relatively unsuited for the efficient grafting of water soluble monomers in aqueous environments where polymerization with these monomers would be most desirable, particularly when chemical initiators are employed. This inefficient grafting is mainly due to the strong tendency of these monomers to form separate non-graft polymers in the aqueous phase. For efficient grafting, it is necessary to maintain the polysaccharide substrate and the water soluble monomer(s) in very close contact, i.e. at high concentration with respect to the aqueous polymerization medium. In this manner, graft polymerization becomes the dominant reaction and the tendency to form ungrafted polymers is minimized.

Several factors, however, prevent the grafting of water soluble monomers to polysaccharide substrates in highly concentrated aqueous environments. With water soluble or dispersed substrates like cellulose derivatives, gums and cooked starches, the aqueous solution viscosities of even low concentrations (10-20%) of polysaccharide in water are prohibitively high and unmanageable. Thus it is not possible to graft a water soluble monomer, e.g., acrylic acid, to a soluble or dispersed polysaccharide substrate in water at, for example, 70% solids. With non-dispersed polysaccharide substrates like cellulose and uncooked starch, which can be heterogeneously suspended in water at 40-60% solids, the graft product itself once produced in water will swell and exhibit very high viscosities during polymerization. This effect usually leads to coagulation of the reaction mixture making it commercially useless.

SUMMARY OF THE INVENTION

The present invention relates to polysaccharide graft copolymers prepared by a water-in-oil emulsion polymerization process in which the polysaccharide and water-soluble monomer are emulsified in an oil phase containing emulsifying agents and polymerized therein. The resultant emulsion polymers are in stable form and may be used directly, for example, as adhesives for prepasted wallpaper, or may be inverted into aqueous systems and used for their thickening or flocculating properties.

Thus, the present invention provides an inverse emulsion which comprises a water soluble or water-swellable graft copolymer dispersed in an oil phase, the water-in-oil emulsion comprising:

(a) 20-80% by weight of the emulsion of an aqueous discontinuous phase comprising 30-70% by weight water and 70-30% by weight of a polysaccharide graft copolymer having a polysaccharide content of 5-50%;

(b) 80-20% by weight of a continuous phase comprising 70-99% inert hydrophobic liquid; and 1-30% by weight of an oil soluble surfactant.

According to the invention, the continuous and discontinuous phases are combined to form an emulsion which is then polymerized, usually by heating under free radical conditions to effect the graft polymerization thereby producing a stable water-in-oil emulsion which contains dispersed therein, finely divided particles of the polysaccharide graft copolymer.

The resultant emulsion polymers are useful as adhesives, particularly as adhesives for prepasted wallpaper. The emulsion may further be inverted in water and used for their thickening or flocculating properties. As such, they find particular use in the clarification of aqueous solutions in papermaking operations, in the treatment of sewage and industrial wastes, as stabilizers for drilling muds, etc.

DETAILED DESCRIPTION OF THE PREFERRED EMBODIMENTS

The polysaccharide substrates suitable for use in the practice of this invention include starches and starch conversion products derived from any plant source; starch ethers and esters; cellulose and cellulose derivatives and various plant gums. The substrate may be used in water soluble or water swellable form.

Starches including those derived from corn, potato, wheat, rice, sago, tapioca, waxy maize, sorghum and amylose, as well as the conversion products and derivatives thereof, are the preferred substrates due to their cost and availability. For certain end uses, derivatized starches have been found effective. In particular, if the graft copolymers are to be used as flocculants, starches derivatized with allyl glycidyl ether have shown optimum properties.

The amount of polysaccharide substrate may vary from 5 to 50%, preferably 20-40%, by weight of the final graft polymer (solids) of this invention.

Monomers which are suitable for the practice of the process of this invention are water soluble (i.e. they have a minimum solubility of 5% by weight in water at 25° C.), are unsaturated and are capable of polymerizing by free radical initiation. Such monomers include acrylic and methacrylic acid; acrylamide, methacrylamide, acrylonitrile; N,N-dialkylaminoalkyl acrylates and methacrylates (wherein the alkyl group contains 1 to 4 carbon atoms); ethylenically unsaturated quaternary ammonium salts such as N,N,N-trimethylaminoethyl methacrylate methyl sulfate or halide, 2-hydroxy-3-methacryloxypropyl trimethyl ammonium methyl sulfate or halide, vinyl benzyl trialkyl ammonium methyl sulfate or halide, dialkyl diallylammonium methyl sulfate or halide; sodium or ammonium styrene sulfonate; vinyl pyrrolidone; hydroxy alkyl acrylates and methacrylates; sodium 2-acrylamide-2-methylpropane sulfonate, etc. Various other water-soluble monomers suitable for graft polymerization with polysaccharides are known to those skilled in the art.

The water-soluble monomers may be used as the sole component of the graft or they may be used as comonomers with each other. The ratio and type of comonomer will depend upon the particular components and designated end-use thereof. Thus, the total amount of water soluble monomer may range from 50 to 95%, preferably 60 to 80%, by weight of the final graft polymer (solids).

The organic or oil phase is comprised of an inert hydrophobic liquid selected from the class of straight and branched chain aliphatic hydrocarbons and aromatic hydrocarbons. The hydrophobic liquid comprises between 20 amd 80% by weight of the emulsion. The preferred range is between 25 to 40% by weight of the emulsion.

Suitable solvents are selected from a large group of organic liquids which include liquid hydrocarbons and substituted liquid hydrocarbons. Preferred group of organic liquids are hydrocarbon liquids, most preferably aliphatic hydrocarbon liquids, which include blends of aromatic and aliphatic hydrocarbon compounds which contain from 4 to 8 carbon atoms. Thus, such organic hydrocarbon liquids as benzene, xylene, toluene, mineral oils, kerosenes, naphthas, and in certain instances, petroleum oils may be used.

Any conventional water-in-oil surfactant can be used in forming the continuous phase. The surfactant may be cationic, anionic or nonionic in nature. Particularly suitable surfactants are the oil soluble polyhydroxyethylated nonionic surfactants for example, hydroxyethylated nonyl phenols, hydroxyethylated long-chain mono-carboxylic acids and fatty acids, fatty acid esters of sorbitol and hydroxyethylated fatty acid esters of sorbitol. The surfactant is present in an amount of 1 to 30% by weight, preferably 2 to 15% by weight of the total emulsion.

Other additives conventionally used by those skilled in the art in the graft polymerization reaction will generally be added to the aqueous monomer solution. Thus, if buffers are required to regulate the pH, as is the case where anionic or a mixture of anionic and cationic monomers are employed, such buffers should be added to the aqueous monomer solution.

Free radical yielding initiators useful in polymerizating ethylenically unsaturated monomers, such as benzoyl peroxide, lauroyl peroxide, potassium persulfate; redox couples such as tertiary butyl hydroperoxide and sodium metabisulfite; and the like are generally used in the polymerization, advantageously in amounts ranging between 0.002 and 0.2% by weight of the oil or monomer phase, depending upon the stability of the initiator. While free-radical polymerizations are most common, polymerizations can also be carried out using high energy irradiation, e.g., gamma irradiation from $CO^{60}$, or high energy electrons from a Van de Graaff accelerator, etc, or ultraviolet irradiation.

Elevated reaction temperature, advantageously between 40° and 70° C., are used with free radical yielding initiators. Within such a temperature range, conversion is substantially complete in from one-half hour to several days, depending upon monomer and reaction variables. High energy or ultraviolet irradiation polymerization is carried out at room temperature or above or below room temperature, as desired.

The reaction is generally carried out at atmospheric or substantially atmospheric pressure. However, superatmospheric pressure is advantageously used when volatile ingredients are involved.

In practice, the water-in-oil emulsifying agent is dissolved in the oil phase, while the free radical initiator, when one is used is dissolved in the oil or monomer phase, depending upon whether an oil or water-soluble initiator is used. An aqueous solution prepared by slurrying the polysaccharide substrate in water with the water soluble monomer or mixed monomers then added to the oil phase with agitation until the monomer phase is emulsified in the oil phase, and the reaction is carried out as indicated above. The order of addition of reaction media ingredients is not important. The reaction is continued with agitation until conversion is substantially complete. A polymeric latex is thereby obtained. The polymer is separated from the reaction medium advantageously by adding a flocculating agent and filtering and is then washed and dried. Alternatively, the latex reaction product can be used as such.

The resulting emulsions can be used directly as additives, particularly as adhesives in the manufacture of prepasted wallpaper where there is relative low viscosity, e.g., in the range of 100 to 1000 cps at relatively high solids of 10 to 40% makes them particularly suitable for coatings.

A further advantage to the graft copolymers produced herein is the ability of these emulsions to be inverted in the presence of water so that the polymer rapidly goes into solution. As such, these polymer containing emulsions release the polymer in the water in a very short period of time when compared to the amount of time required to dissolve a comparable solid graft copolymer. This rapid invention renders the emulsions especially suited for flocculating and thickening applications as are well known in the art.

It will, of course, be recognized by those skilled in the art that the specific end use application will dictate the optimal composition of the graft copolymer. Thus, for example, while some compositions may provide superior flocculating properties, other compositions should be used in formulating graft copolymers to be used as retention aids.

In the following examples, which are merely illustrative of the various embodiments of the present invention, all parts are by weight and all temperatures in degrees Celsius unless otherwise indicated.

EXAMPLE 1

This example describes the preparation of the allylglycidyl ether derivatized starch used in the subsequent examples.

A total of 100 parts of acid hydrolyzed waxy starch (water fluidity 85) was slurried in an aqueous solution of 1.5 parts of sodium hydroxide and 25 parts sodium sulfate in 150 parts water, then 1.0 part allylglycidyl ether was added to the starch slurry. The mixture was agitated at 40° C. for 6 hours and the pH was lowered to 5.5 by adding 9.3% aqueous hydrochloric acid. The starch derivative was recovered by filtration, washed three times with water and air dried. This starch was designated Starch "A".

Another starch derivative was prepared in a similar manner using 0.5 parts of the allylglycidyl ether instead of 1.0 parts. The starch was referred to as Starch "B".

A third starch derivative, Starch "C", was prepared using 0.2 parts of allylglycidyl ether.

EXAMPLE 2

This example demonstrates the copolymerization of modified Starch "A" of Example 1, acrylamide and sodium acrylate to form the water-in-oil emulsion of the present invention.

A 1-liter four-neck flask was fitted with a thermometer, condenser, agitator and subsurface purge. The following charges were prepared:

A. 30.0 g Acrylamide, 50.0 g acrylic acid, 84.0 g 45% sodium hydroxide solution, 10.0 g modified starch of Example 1, dissolved in 160.0 g water and emulsified in a mixture of 27.5 g Tween 85 (polyoxyethylene sorbitan trioleate) and 145.0 g Ashland 140 (an aliphatic hydrocarbon having a boiling point of 188° C.) using a Greco Homogenizer mixer.

B. 1.5 g 4% solution of ethylene diamine tetraacetic acid.

C. 0.8 g Ashland 140, 0.06 g ethyl acetate, and 0.005 g Vazo-52. (2,2-azobis-2,4-dimethyl valeronitrile).

D. 14.0 g Ashland 140, 0.1 g ethyl acetate, and 0.02 g Vazo-52.

E. 0.8 g Ashland 140, 0.08 g ethyl acetate, and 0.024 g Vazo-52. 20% of pre-emulsion A was charged to the reactor and was purged subsurface with nitrogen for 1 hour. 80% of the pre-emulsion A in a slow-add funnel also was purged with nitrogen for 1 hour.

Agitation was begun at 200 rpm and Charge B added. The mixture was heated to 63°–65° C. while Charge C was added at 55° C. Ten minutes later, 80% of Charge A and Charge D were added separately and slowly over 3 hours. After the slow-addition, charge E was added at 75° C. and the mixture heated to 80° C., cooled and discharged. The solids were 28.3%. The copolymer was designated Copolymer 1.

The latex of Example 2 was diluted with water to a viscosity of about 1500 cps and coated on a wallpaper by a wire bar, then dried in a 60° C. oven. The coated wallpaper showed good remoistening character and adhesion to the wall.

EXAMPLE 3

Using the procedure of Example 2, other graft copolymers were prepared as follows:

Copolymer 2: 0.08 N,N'-methylene-bisacrylamide was included in Charge A. The solids were 28.6%.

Copolymer 3: 20.0 g modified starch A of Example 1 and 178.0 g water was used instead of 10.0 g modified starch. The solids were 28.6%.

Copolymer 4: Similar to Copolymer 3 using 20.0 g. Starch "C". The solids were 28.4%.

Copolymer 5: Similar to Copolymer 4 but comprising 30 parts Starch "C"/20 parts acrylamide/30 parts acrylic acid/20 parts sodium 2-acrylamide-2-methylpropane sulfonate and 0.07 parts N,N'-methylenebisacrylamide. The solids were 26.9%.

Copolymer 6: similar to Copolymer 1 using hydroxypropyl tapioca starch instead of starch A. The solids were 26.9%.

Copolymer 7: Similar to Copolymer 1 using acid converted tapioca starch. The solids were 25.2%.

Copolymer 8: Similar to Copolymer 1, using hydroxypropyl guar gum. The solids were 26.9%.

Copolymer 9: Similar to Copolymer 5 using 20.0 parts Starch B. The solids were 27.0%.

Copolymer 10: Similar to Copolymer 1, using 6 g. hydroxypropyl methyl cellulose. The solids were 25.9%.

The copolymers were then inverted in water and the viscosity was determined by Brookfield viscometer at 20 RPM. Following are the results:

| Copolymer | Solids in Water | Viscosity |
|---|---|---|
| 4 | 2.5 | 10,000 |
| 5 | 2.5 | 13,000 |
| 6 | 2.5 | 10,650 |
| 7 | 2.5 | 9,200 |
| 8 | 2.5 | 5,150 |
| 9 | 2.5 | 9,000 |
| 10 | 2.5 | 15,000 |

The above data indicates that the graft copolymers 1–10 can be used as thickeners.

EXAMPLE 4

Other graft copolymers were prepared following the general procedure of Example 2. The resultant water-in-oil emulsions were tested as flocculants using the following clay flocculating test:

A 1% solution of clay was prepared by dissolving 38 g. Attrasorb clay (available from Englehard Industries, Inc.) in 3462 g. water with stirring overnight. A 1 liter graduated cylinder equipped with a plunger was filled with the clay solution and plunged three times to mix. Then 40 ml of a 0.1% solution of the copolymer was added and plunged again. The plunger was removed and the time for the flocs to settle below the 700 ml level was measured and recorded as were the size of the floc and the clarity of the supernate.

The graft copolymer compositions and test results are shown in Table I. The results are compared with a commercial flocculant designated "Control".

TABLE I

| Composition | | | | Clay Flocculantion | |
|---|---|---|---|---|---|
| Starch Used | Starch Amount | DMDAAC* | Acrylamide | Time | Clarity |
| D | 15 | 20 | 15 | 53 | Cloudy |
| C | 20 | 15 | 32 | Clear | |
| D | 15 | 9 | 6 | 40 | Cloudy |
| C | 15 | 9 | 6 | 35 | Clear |
| Control | | | | 34.5 | Clear |

D amioca (85 water fluidity)
*DMDAAC: dimethyldiallyl ammonium chloride

EXAMPLE 5

Using the procedure of Example 2, other starch-acrylamide-acrylic acid graft copolymers were prepared and tested as pigment retention agents using the following procedure:

The polymers were added to a bleached sulfite pulp at concentrations of 0.025, 0.05 and 0.25% based on the weight of the dry pulp. The pigment retention values were determined at a pH of 7.0 with no alum present. The paper sheets were then prepared on the Williams Standard Sheet Mold and were tested for titanium dioxide pigment retention by the method described in TAPPI Standard #T413m.58.

The graft copolymer compositions and testing results are shown in Table II and compared with a blank and a commercially employed retention agent which was designated "control" and assigned as 100% standard value.

TABLE II

| Composition | | | | $TiO_2$ Retention Addition Level | | |
|---|---|---|---|---|---|---|
| Starch Used | Starch Amount | Acrylamide | Acrylic Acid | 0.025% | 0.05% | 0.25% |
| D | 15 | 20 | 6.6 | 76.9 | 80.1 | 77.3 |

TABLE II-continued

| Composition | | | | $TiO_2$ Retention Addition Level | | |
|---|---|---|---|---|---|---|
| Starch Used | Starch Amount | Acrylamide | Acrylic Acid | 0.025% | 0.05% | 0.25% |
| C | 15 | 20 | 6.6 | 103.0 | 107.7 | 99.8 |
| Blank | | | | 47.3 | 48.4 | 47.3 |
| Control | (at 0.025% addition level) | | | 100.0 | 100.0 | 100.0 |

The results show that both graft copolymers served as retention agents with the copolymer containing the allyl glycidyl ether starch derivative exhibiting optimum performance.

The graft copolymers prepared above were then tested for calcium carbonate retention and alkalic dynamic retention properties using the following procedure:

Calcium Carbonate Retention:

In a 1000 ml beaker, 660 ml of pulp having 0.5% consistency (0.35% fiber and 0.15% calcium carbonate) were added. The pH of the pulp was first adjusted to 8.0 and then 1.5% alum (on the weight of pulp) was added. The whole mixture was stirred with a flat blade stirrer at a speed of 120 rpm. Samples were prepared at 0.03, 0.05 and 0.25% addition levels of calcium carbonate and agitation was continued for 20 seconds. The whole mixture was transferred to the headbox and agitated slowly. After removing the stirrer and waiting for 5 seconds, the drain lever was pulled up sharply. After 5 seconds, the lever was released and the screen was removed. Two blotters were placed on the top and a heavy roller-couch was used to dry the sheet. The sheet was further dried in a Pako dryer (set at 300° F.). After 24 hours, the amount of calcium carbonate retained on the sheet was measured with a Panalyzer.

Alkalline Dynamic Retention

A pulp comprising 400 CSF bleached 80:20 hard wood/soft wood bleached Kraft (made in the Valley Beater) containing 30% calcium carbonate on pulp weight in water containing 100 ppm hardness was diluted to 1.0% consistency with water of 100 ppm hardness. The final pulp was approximately 0.70% fiber and fiber fines plus 0.3% calcium carbonate. (Of this 1% solution, 34.6% comprised fines.) 0.5% alum (based on pulp weight) was added and mixed for one hour, then the pulp was pH adjusted to 7.6 with dilute NaOH. Then 0.5% of an amphoteric corn starch treated with diethylaminoethyl chloride, sodium tripolyphosphate and adipic acid and 0.175% of an emulsion of an octenyl succinic acid anhydride such as described in U.S. Pat. No. 3,102,064 were added to the pump while mixing at 40 rpm. After 30 minutes, a polymer sample (0.025% on the weight of pulp) was added and allowed to mix for another 30 seconds. The percent retentions of the first pass and fines were determined by the method described in TAPPI provisional test method T261pm-79. This test is used to measure the relative tendency of the fines fraction to stay with the fiber rather than to follow the water into the filtrate under graduated turbulence in simulation of paper machine conditions. The higher the value, the better the additive will function in a paper making operation.

Table III shows the results obtained.

TABLE III

| | $CaCO_3$ Retention | | | Alkaline Dynamic | |
|---|---|---|---|---|---|
| Starch Used | 0.03% | 0.05% | 0.25% | % First Pass | % Fines Retention |
| D | 123.3 | 108.7 | 115.4 | 72.4 | 46.6 |
| C | 133.6 | 112.8 | 123.5 | 74.7 | 54.4 |
| Blank | 58.5 | 44.7 | 44.7 | 69.5 | 43.4 |
| Control | 71.4 | 68.5 | 68.5 | Not Tested | |
| Hydraid 771* | 100.0 | 100.0 | 100.0 | 78.3 | 59.6 |

*An acrylamide/acrylic acid copolymer available from Calgon, used at 0.05% additive level.

These results show the graft copolymers to possess superior calcium carbonate retention properties.

EXAMPLE 6

Using a procedure similar to that described in Example 2, other starch graft copolymers were prepared and tested for drainage using the following procedure:

Unbleached soft wood kraft pulp at a 1.5% consistency is beaten in a Valley Beater to approximately 600 C.S.F. (Canadian Standard Freeness). The pulp is diluted with water to obtain a 0.5% consistency then neutralized to 7.0 pH with sulfuric acid. This pulp stock is used for the drainage test in a neutral system. Samples of the polymers are added at treatment levels of 0.1 to 0.2% on dry pulp basis to a 345 ml aliquot of the neutral pulp stock. After mixing for one minute, the treated pulp stock is added to a graduated dynamic drainage cylinder containing 1553 ml of 100 ppm $CaCO_3$ water which has a marine type propeller positioned at the 500 ml mark. A predetermined drainage volume of 1200 ml was chosen. After the pulp slurry is mixed for 30 seconds, the stopper at the bottom of the cylinder is pulled. When the pulp stock volume is drained to the 1500 ml mark, the seconds timer is started. After the volume is drained to the 300 ml cylinder mark, the timer is stopped. A sample's drainage rate is measured in ml/sec with the best drainage aid having the fastest drainage rate.

The control for this test consisted of a cationic starch ether derivative of the prior art, i.e., the Dow-Quat, a quaternized waxy maize starch containing 0.26% nitrogen.

The copolymers were also tested as clay flocculants using the procedure described in Example 4.

TABLE IV

| Composition | | | | Drainage Add. Level | | Clay Flocculation | |
|---|---|---|---|---|---|---|---|
| Starch Used | Starch Amount | DMD-AAC* | Acrylamide | 0.1% | 0.2% | Time | Clarity |
| F | 25 | 20 | 15 | 142.4 | 146.4 | 38 | Clear |
| E | 25 | 20 | 15 | 157.1 | 162.9 | 36 | Clear |
| Blank | | | | 86.3 | 74.1 | | |
| Control | | | | 100.0 | 100.0 | | |

F: CATO-KOTE ®: a diethylaminoethyl chloride treated 85 fluidity corn starch from National Starch and Chemical Corporation.

The above results show these graft copolymers would be used as drainage aids in the manufacture of paper or as clay flocculants.

EXAMPLE 7

The following example illustrates the use of the graft copolymers of the present invention as drilling mud fluid loss control agents.

Starch graft copolymers were prepared as in Example 2 using 0.2% allyl glycidyl ether treated amioca (85 fluidity) with varying levels of comonomers. Compositions of the samples are shown in TABLE V.

TABLE V

| Co-polymer | Starch | Acryl-amide AM | Acrylic Acid AA | AMPS* | N,N'MBAM** |
|---|---|---|---|---|---|
| 11 | 30 | 20 | 30 | 20 | 0.07 |
| 12 | 30 | 50 | 20 | — | 0.07 |
| 13 | 30 | 40 | 30 | — | 0.07 |
| 14 | 30 | 20 | 10 | 40 | 0.07 |
| 15 | 30 | 20 | — | 50 | |

*sodium 2-acrylamide-2-methylpropane sulfonate
**N,N'—methylenebisacrylamide

The copolymers were tested for fluid loss using the standard procedure described in API Recommended Practice, 13B, May, 1982. Samples were stirred into drilling muds containing varying levels of salt. Tests were conducted after 16 hour agings of these muds at 180° F. and 300° F. Corn starch (pregelatinized) and an acrylamide/acrylic acid (AM/AA) copolymer (both employed in the industry as fluid loss control agents) were run as controls.

Criteria for performance is based on their ability to maintain the lowest amount of fluid (in cubic centimeters) lost from the mud especially in high polyvalent salt brines and at high temperature.

The results of TABLE VI (below) indicate that these products exhibit advantages over conventional additives. Samples 14 and 15 proved especially useful at high temperatures and in the presence of polyvalent salt as often encountered during drilling operations.

TABLE VI

| Co-polymer | 4% NaCl Fluid Loss 180° F. | Sat'd NaCl Fluid Loss 180° F. | Sat'd NaCl Fluid Loss 300° F. | 4% CaCl$_2$ Fluid Loss 180° F. | Sat'd CaCl$_2$ Fluid Loss 180° F. | Sat'd CaCl$_2$ Fluid Loss 300° F. |
|---|---|---|---|---|---|---|
| 11 | 7.4 | 7 | 6 | 25 | 250 | 300+ |
| 12 | 6 | 7.6 | 34 | 9 | 4 | 300+ |
| 13 | 6 | 7.6 | 15 | 46 | 205 | 300+ |
| 14 | 8 | 7 | 8 | 7.6 | 2.5 | 47 |
| 15 | 8.5 | 7 | 8 | 10 | 3 | 1 |
| Corn Starch | 45 | 8 | 300+ | 20 | 8.5 | 300+ |
| AM/AA | 6 | 6.8 | 5.5 | 7 | 2.5 | 300+ |
| Blank | 53 | 214 | 300+ | 125 | 300+ | 300+ |

Treatment Level = 1.14%

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:

1. A water soluble or water swellable graft copolymer dispersed in an inverse water-in-oil emulsion comprising:
    (a) 20–80% by weight of the emulsion of an aqueous discontinuous phase comprising 30–70% by weight water and 70–30% by weight of a polysaccharide copolymer having a polysaccharide content of 5 to 50%; and
    (b) 80 to 20% by weight of a continuous phase comprising 70 to 99% inert hydrophobic liquid; and 1 to 30% by weight of an oil soluble surfactant.

2. The graft copolymer of claim 1 wherein the polysaccharide is starch.

3. The graft copolymer of claim 2 wherein the starch is selected from the group consisting of corn, potato and tapioca.

4. The graft copolymer of claim 2 wherein the starch is an allyl glycidyl ether starch derivative.

5. The graft copolymer of claim 1 wherein the polysaccharide is present in an amount of 20 to 40% by weight of the copolymer.

6. The graft copolymer of claim 1 wherein the water soluble monomer is selected from the group consisting of acrylic and methacrylic acid; acrylamide, methacrylamide, acrylonitrile; N,N-dialkylaminoalkyl acrylates and methacrylates (wherein the alkyl group contains 1 to 4 carbon atoms); ethylenically unsaturated quaternary ammonium salts; sodium or ammonium styrene sulfonate; vinyl pyrrolidone; hydroxy alkyl acrylates and methacrylates; and sodium 2-acrylamide-2-methylpropane sulfonate.

7. The graft copolymer of claim 6 wherein the water soluble monomer is selected from the group consisting of acrylic acid, acrylamide, dimethyl diallyl ammonium chloride, sodium 2-acrylamide-2-methylpropane sulfonate and 2-hydroxy-3-methacryloxy-propyl trimethyl ammonium methyl chloride.

8. The graft copolymer of claim 1 wherein the water soluble monomer is present in an amount of 60 to 80% by weight of the copolymer.

9. The graft copolymer of claim 1 wherein the inert hydrophobic liquid is selected from the group consisting of benzene, dichlorobenzene, toluene, xylene, 1,2-dichloroethane, heptane, octane, isoctane and nonane.

10. The graft copolymer of claim 9 wherein the inert hydrophobic liquid is a liquid aliphatic hydrocarbon.

11. The graft copolymer of claim 1 wherein the inert hydrophobic liquid comprises 25 to 40% by weight of the emulsion.

12. The graft copolymer of claim 1 wherein the oil soluble surfactant is a nonionic surfactant selected from the group consisting of hydroxyethylated nonyl phenols, hydroxyethylated long-chain monocarboxylic acids and fatty acids, fatty acid esters of sorbitol and hydroxyethylated fatty acid esters of sorbitol.

13. The graft copolymer of claim 1 wherein the oil soluble surfactant is polyhydroxyethylated nonionic surfactant.

14. The graft copolymer of claim 1 wherein the oil soluble surfactant is present in an amount of 2 to 15% by weight of the total emulsion.

15. A process for the preparation of an inverse water-in-oil emulsion of a water soluble or water swellable polysaccharide graft copolymer comprising the steps of:
    (a) forming an aqueous phase comprising 30–70% by weight water with a mixture of 70–30% by weight of a polysaccharide and a water soluble monomer wherein the polysaccharide comprises 5–50% by weight of said mixture;
    (b) adding thereto a solution comprising 70–99% inert hydrophobic liquid and 1–30% by weight of an oil soluble surfactant;
    (c) polymerizing the resultant blend to produce a stable water-in-oil emulsion which contains dispersed therein finely divided particles of a polysaccharide graft copolymer.

16. The process of claim 15 wherein the polymerization is effected by heating under free radical conditions.

17. A flocculant comprising the water-soluble or water swellable graft copolymer prepared by the water in oil emulsion of claim 1.

18. An adhesive comprising the water soluble or water swellable graft copolymer prepared by the water in oil emulsion of claim 1.

19. The adhesive of claim 18 wherein the water soluble monomer is acrylamide or acrylic acid and the polysaccharide is starch.

20. A drilling mud fluid loss control agent comprising the water soluble or water swellable graft copolymer of claim 1.

* * * * *